(12) United States Patent
Moskal et al.

(10) Patent No.: US 6,630,073 B1
(45) Date of Patent: Oct. 7, 2003

(54) SONIC CONTAMINATED RESOURCE TREATMENT METHOD AND APPARATUS

(76) Inventors: Eugene A. Moskal, 166 Summerhill Place, Kelowna, British Columbia (CA), V1V 1T6; H. Willard Spencer, III, 1835 Sawinson Road, Kelowna, British Columbia (CA), V1P 1C5

(*) Notice: Subject to any disclaimer, the term of this patent is extended or adjusted under 35 U.S.C. 154(b) by 28 days.

(21) Appl. No.: 09/942,471

(22) Filed: Aug. 29, 2001

(51) Int. Cl.[7] .................................................. C02F 1/72
(52) U.S. Cl. .................. 210/748; 210/758; 210/759; 210/760; 210/765; 210/192; 210/194; 210/198.1; 210/205; 422/20; 422/186
(58) Field of Search ................... 210/748, 758, 210/759, 760, 765, 192, 194, 198.1, 205; 422/20, 186

(56) References Cited

U.S. PATENT DOCUMENTS

| | | |
|---|---|---|
| 2,138,839 A | 12/1938 | La Chambers |
| 2,417,722 A | 3/1947 | Wolff |
| 4,003,832 A | 1/1977 | Henderson et al. |
| 4,537,599 A * | 8/1985 | Greenwald, Sr. |
| 4,743,545 A | 5/1988 | Torobin |
| 5,380,445 A | 1/1995 | Rivard et al. |
| 5,779,891 A | 7/1998 | Andelman |
| 5,895,577 A | 4/1999 | Frei et al. |
| 6,019,947 A | 2/2000 | Kucherov |
| 6,238,546 B1 | 5/2001 | Knieper et al. |

* cited by examiner

Primary Examiner—Betsey Morrison Hoey
(74) Attorney, Agent, or Firm—Ellis & Venable

(57) ABSTRACT

An apparatus and water treatment method uses Sonically Induced Dissociative Reactions (SIDR) and Multi-bubble Sonoluminescence (MBSL) to facilitate Sonically Bounds State Oxidation (SBSO) within a SIDR chamber. Included within the SIDR chamber is counter-flow ultrasonic radiation and an optional binding agent.

19 Claims, 5 Drawing Sheets

SONIC CONTAMINATED RESOURCE TREATMENT METHOD AND APPARATUS

BACKGROUND OF THE INVENTION

1. Field of the Invention

The present invention relates to the field of contaminated resource treatment, and more particularly to the oxidation of contaminants in a fluid and using binding agents.

2. Discussion of Related Art

The quantity of fluids containing contaminants (i.e. contaminated resources) produced by industrial and household activity continues to grow. Additionally, the responsibility to properly dispose of fluids (e.g. water etc.) containing contaminated resources increases as new and more stringent environmental standards are introduced. For example, companies and municipalities are increasingly charged with the responsible treatment and disposal of their water borne wastes. As a result, contaminated resource treatment has emerged as a fundamental concern.

Organic hydrocarbons are a primary water contaminant and therefore a primary concern addressed during water treatment. Organic hydrocarbon contaminants are generally associated with the production of oil or oil-based solvents and often reach the water supply by evaporation and condensation. Carbon-based chemicals are suspected carcinogens and also of concern because of the ready absorption and metabolism by humans and animals.

Metals have many sources that create hazardous waste and may, for example, contaminate the water supply. Metals such as cadmium and lead have profound adverse effects on humans, animals, and plant life. Disposed of oils often carry metals as a result of lubrication use within metal engines. Oils also used as coolants in manufacturing or repair, or as solvents in the electronics industry are also sources of heavy metal contamination.

Another contaminant of water are microorganisms such as *E. coli*, amoebas, cryptosporidium, cholera, viruses, and bacteria. Chlorine and chlorine treatment is a current conventional treatment. However, depending upon the water conditions, and other conditions such as silting during spring run-off or flooding, chlorine and chloramine may have little or no effect. In fact the chlorine can react with the organic material to produce chlorinated hydrocarbons.

Water treatment methods have evolved to deal with the above problems. Related art apparatuses have utilized oxidation systems to oxidize metal and hydrocarbon contaminants to acceptable discharge levels and drinking water standards. Oxidation also destroys the cellular walls of microorganisms which may then dissipate harmlessly into the water. Oxidation is often catalyzed with heat energy. The rapid oxidation of organic or metals species in air results in carbon dioxide and water with organics or a metal oxide or "natural ore" with metals. However, while heat energy is one means of facilitating the oxidation of waste water contaminants, alternative means have become more preferred for various reasons particularly related to safety.

At least one related art disclosure has implemented apparatuses to facilitate the breakdown and oxidation of contaminants in waste water. U.S. Pat. No. 4,003,832 issued to Henderson et al., discloses the use of a sonication-ozonation tower to facilitate the oxidation of pre-filtered waste water. Other related art methods and apparatuses use sonic radiation to further facilitate the oxidation process by reducing the size of the contaminants to a size more readily suitable for oxidation.

Exemplary methods and apparatuses to facilitate the breakdown of contaminants in waste water include: U.S. Pat. No. 5,895,577, which employs a sonication tank to disintegrate microbial sludge; U.S. Pat. Nos. 2,1388,39 & 2,417,722, which uses sonic energy to treat consumable liquids; U.S. Pat. No 5,380,445, which is used to rupture the cell walls of biological microorganisms; U.S. Pat. No. 6,019,947, which uses dynamic cavitation to sheer coagulants and sludge and bacteria from waste water.

While the above discussed apparatuses prove useful for water treatment, additional improvements in apparatuses and increased efficiencies are available for exploitation in the waste water treatment industry. For instance, it is common for waste water to be re-circulated through a water treatment plant or process until water of an acceptable nature is output as an effluent. Variables affecting the necessity to re-circulate waste water include the level of contaminants in the waste water, the properties of the contaminants in the waste water, and the efficiency of the waste water treatment process. It follows that it would be desirable to increase the efficiency of existing waste water treatment processes.

SUMMARY OF THE INVENTION

While the above methods and apparatuses of contaminant breakdown and oxidation are desirable, the method of the present invention, Sonically Bound State Oxidation (SBSO) provides increased efficiency in the oxidation of contaminants in a contaminated resource. As a result, fewer contaminants and fewer intermediate products escape the oxidation reaction. Moreover, oxygen requirements are minimized due to the increased efficiency and bound nature in which the contaminate molecules are captured and held until the oxidation reactions carry out to completion. Thus, SBSO energy requirements are minimal and excess energy is not required to compensate for energy lost through evaporation or through the creation of unwanted secondary species.

In one aspect of the invention, a reaction chamber design increases molecular activity to facilitate Sonically Induced Dissociative Reactions (SIDR) and Multi-bubble Sonoluminescence (MBSL) to thereby promoting SBSO.

In another aspect of the invention, Sonically Induced Dissociative Reactions (SIDR) and Multi-bubble Sonoluminescence (MBSL) are enhanced within a reaction chamber by purposefully directing the flow of the contaminated resource substantially counter to the direction of propagating ultrasonic pressure waves. In yet another aspect of the invention, a binding agent is introduced into reaction chambers of the above designs.

DETAILED DESCRIPTION OF THE EMBODIMENT

Figure 5:
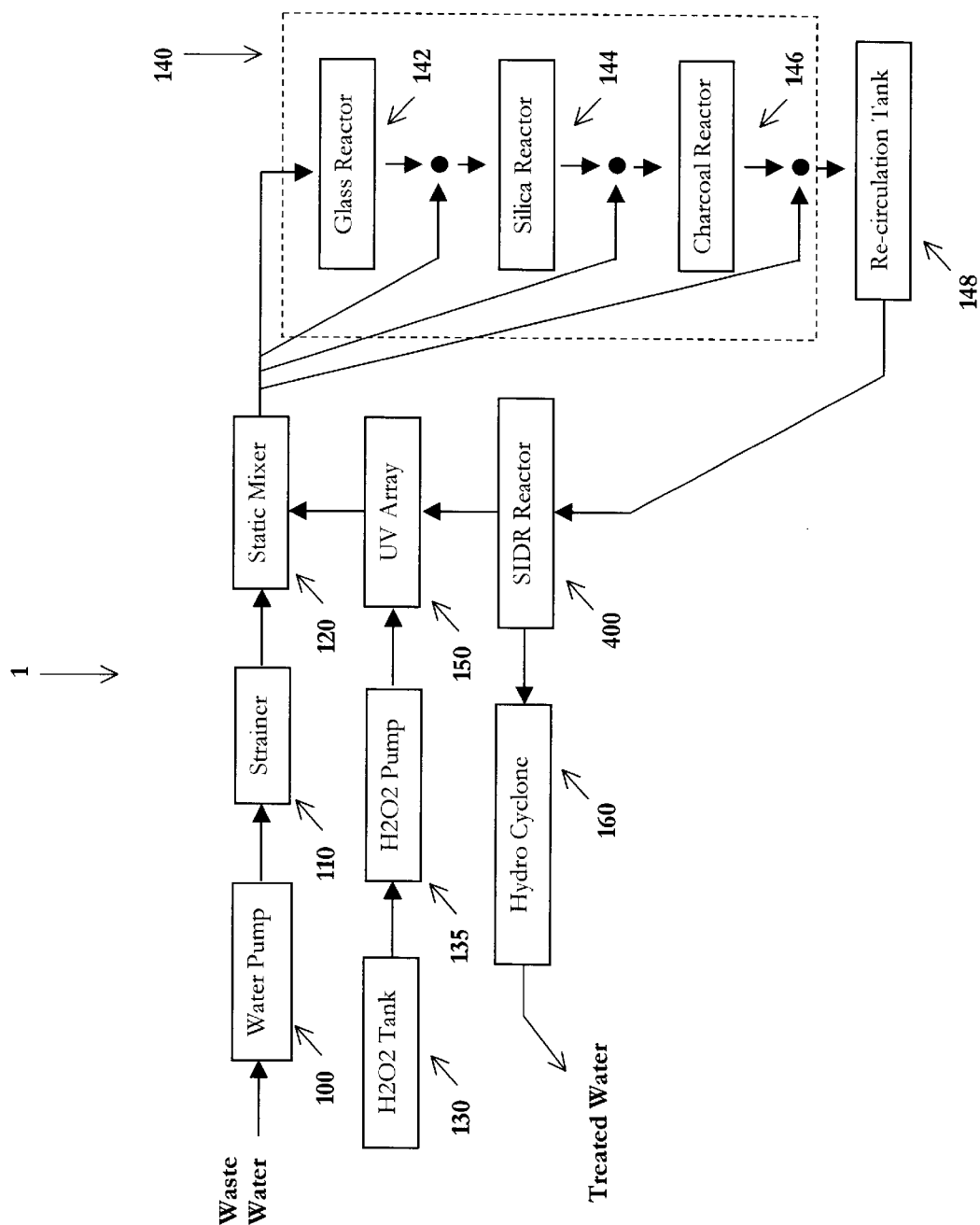
FIG. 5 depicts a logical block diagram of an exemplary water treatment plant 1 implementing an embodiment of the invention.

The invention as summarized above can be implemented in several alternate embodiments. The contaminated resource in the description that follows is contaminants in water, however this is merely an exemplary contaminated resource and one of ordinary skill in the art could apply the teachings herein to additional contaminated resources. One embodiment of the invention may be implemented in an exemplary waste water treatment plant 1. The exemplary plant 1 is depicted in FIG. 5 in logical block diagram form. However, the exemplary plant 1 implementing the invention is for explanation purposes and not intended to limit the scope of the invention. An ordinarily skilled practitioner in the art could modify the disclosure herein to manifest alternate embodiments employing the method and the apparatuses of the invention.

The exemplary plant 1 will include front end components to transfer the waste water such as a water pump 100 and at least one or more mechanical strainers or pre-filters 110. While additional oxidizing agents are contemplated to also be useful, preferred oxidizing agents may be supplied or generated in an ordinary way such as by an $H_2O_2$ tank 130, an $H_2O_2$Pump 135 and an air pump (not shown) together with an ultra-violet array 150. The preferred concentrations of ozone and hydrogen peroxide are 0–500 PPM and 0–10,000 PPM, respectively. Thereafter, the oxidizing agents and the pre-filtered contaminated resource is combined in a static-mixer 120 where the oxidizing agent and the contaminated resource are intimately commingled. The commingled oxidizing agent and contaminated resource is fed into a reaction chamber (e.g. BSO Reactor 140) that contains at least one type of binding agent. Examples of binding agents are contemplated to include engineered clays, diatomaceous earth, fullerenes, bucky balls, nanotubular forms, and natural and synthetic engineered zeolites.

In the exemplary plant 1, the BSO Reactor 140 contains at least one of the exemplary binding agents in a packed bed 144. In a preferred embodiment the BSO Reactor 140 is further comprised of glass 142, silica 144, and charcoal 146 reactors, which each provide reaction sites for oxidizing reactions of the waste-water contaminant having different properties. Further, mechanical filtering can be used to bypass a certain reactor (e.g. 142 & 144) subject to the properties of the contaminants in the waste water. A least a portion of the contaminant that is processed within the BSO Reactor 140 will remain unbound and not oxidized. This portion of unbound waste-water contaminant is passed next to a reaction chamber implementing the method of the invention, a SIDR reactor 400 which facilitates the oxidation of an additional portion of contaminants within the remaining contaminated resource, and further re-energizes and extends the life of the atomic oxygen and hydroxyl radicals that were originally generated within the UV array 150 and which are ultimately re-introduced into the contaminated resource in the static mixer 120.

Figure 1:
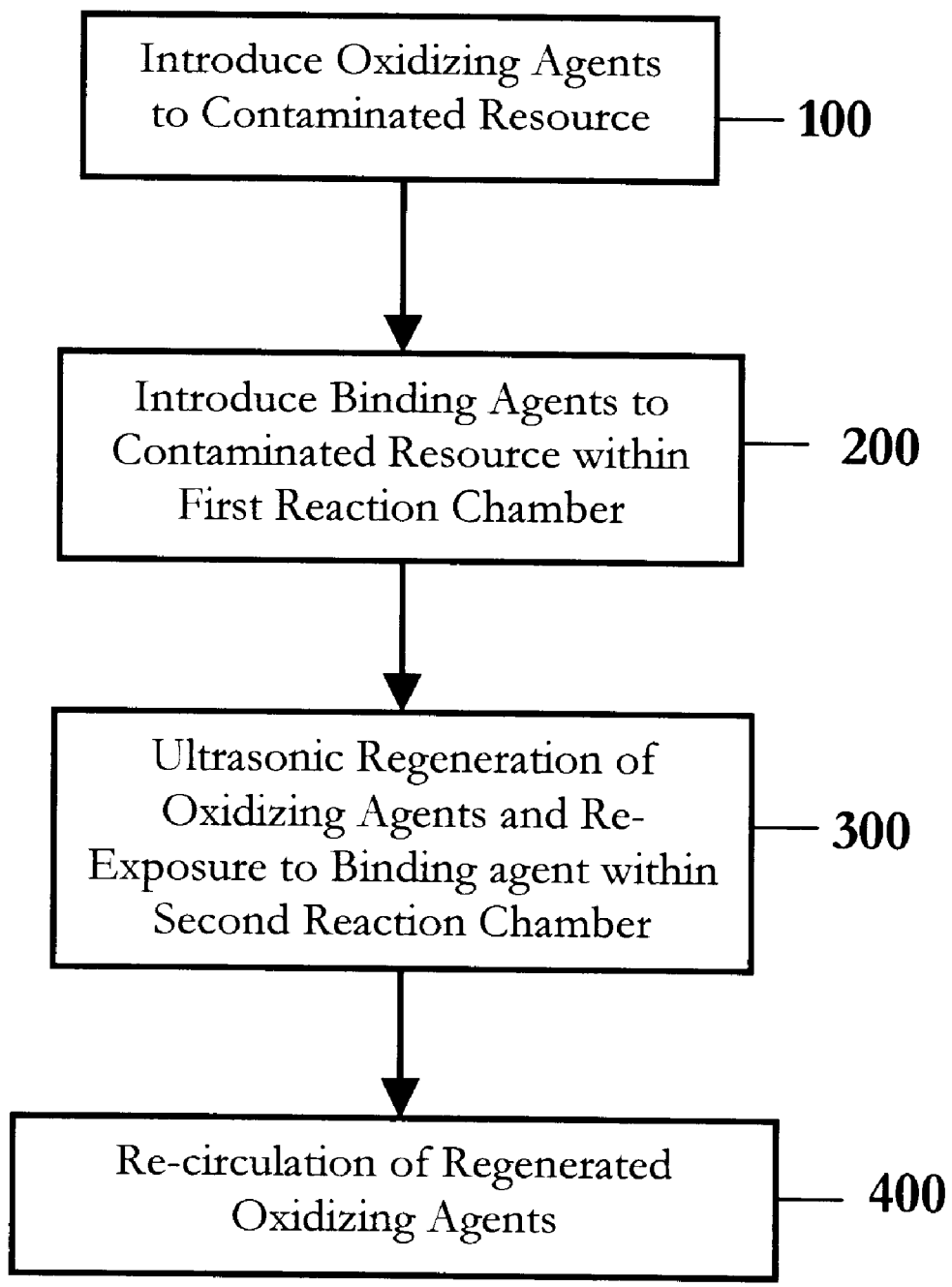
FIG. 1 depicts a flow diagram of the steps of a first preferred method of the invention.
Figure 2:
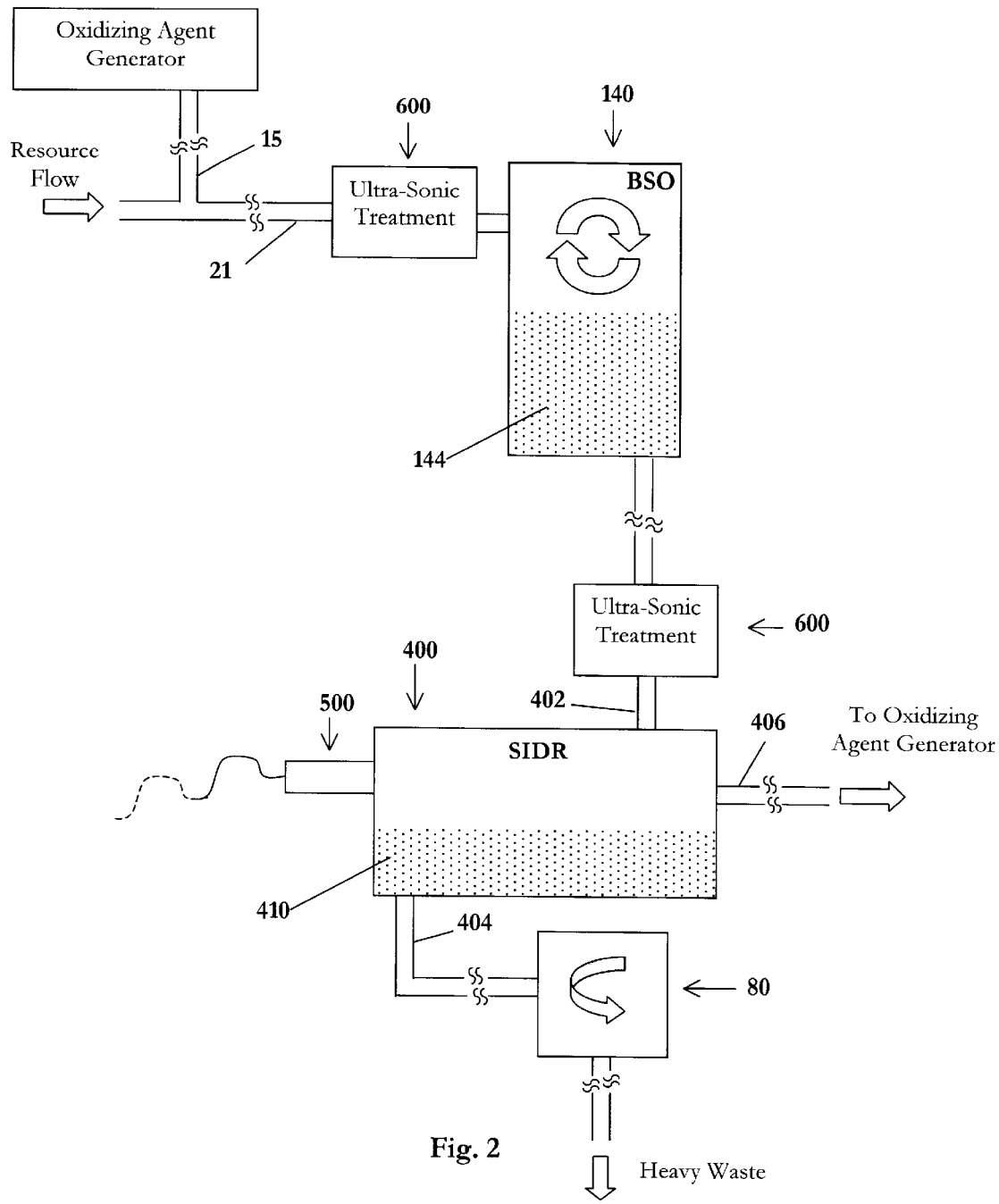
FIG. 2 depicts a logical diagram of the positioning of an apparatus implementing a preferred embodiment of the invention in relation to other components in a water treatment system.

The unbound and non-oxidized contaminated waste-water is transferred by pump, or by other means such as gravity, to the SIDR reactor 400. A second ultrasonic transducer 600 may be used both to increase the breakdown of waste water contaminants thereby increasing the oxidation reactivity of the contaminants, and also to enhance the capability of the oxidizing agents. The SIDR Reactor 400 is depicted in more detail within the context of the exemplary plant 1 in FIG. 2. The illustrated order of plant 1 components is preferred, however, the actual order of the treatment plant 1 components can be varied to a reasonable extent as would be obvious to one of ordinary skill in the art. In an alternate embodiment, the SIDR reactor 400 is placed before the BSO reactor 140.

Figure 3:
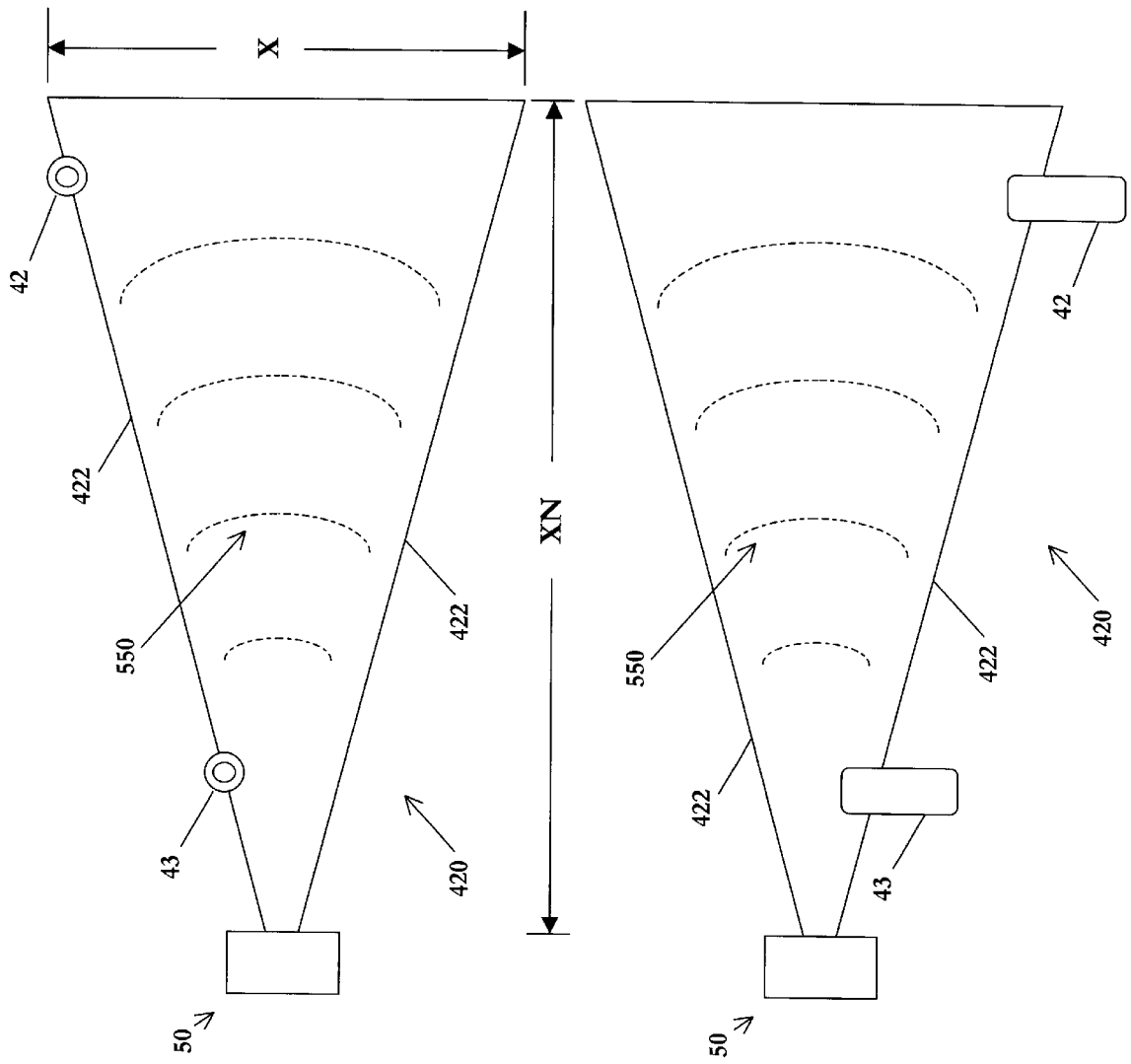
FIG. 3a depicts a side view of a preferred embodiment of the SIDR chamber 400.
FIG. 3b depicts a top view of a preferred embodiment of the SIDR chamber 400.

FIG. 3a is a side view of a preferred SIDR reactor 400. FIG. 3b is a top view. The contaminated resource is introduced into the SIDR reactor chamber 420 through SIDR chamber inlet 42 and exits via a SIDR chamber outlet 43. An ultrasonic transducer 500 within the SIDR chamber 420 increases the oxidation reactivity of the contaminants in the contaminated resource. Moreover, the pressure waves created by the transducer 500 creates the conditions for SIDR and MBSL within the contaminated resource and oxidizing agents respectively. Preferably, the flow of the resource through the inlet 42 and outlet 43 is directed into and out of the SIDR chamber 420 in a direction substantially perpendicular to pressure waves 550 generated by the ultrasonic transducer 500. This will direct the flow of contaminated resource through the SIDR chamber 420 in a direction substantially counter to the propagating direction of ultrasonic pressure waves 550 emanating from the transducer 500.

In the illustrated embodiment, the cross-sectional shape of SIDR reaction chamber 420 features SIDR chamber walls 422 that match the shape of the pressure waves 550 that emanate from the transducer. A depiction of a preferred SIDR reactor 400 design is illustrated in FIGS. 3a and 3b. Alternate volumetric SIDR chamber 420 shapes are also possible (e.g. sphere) as would be apparent in light of the disclosure herein. In the depicted embodiment, the ultrasonic transducer 500 is positioned at one end of the conically shaped SIDR chamber 420 so that the SIDR chamber walls 422 are angled to reduce the destructive interference of the pressure waves 550 that will emanate from the ultrasonic transducer 500.

Optionally included within the SIDR chamber 420 is a binding agent in a packed bed 410. Acceptable binding agents include but are not limited to activated and engineered carbons, silica and siliceous materials, sacrificial and other engineered clays, molecular sieves, reverse osmosis membranes, ion exchange media, zeolites, diatoms and diatomaceous earth, fullerenes, Bucky balls and other forms of nanotubular carbons. Preferred concentrations of binding agents are within the range of 65–95% of the volume of the SIDR chamber 420.

Figure 4:
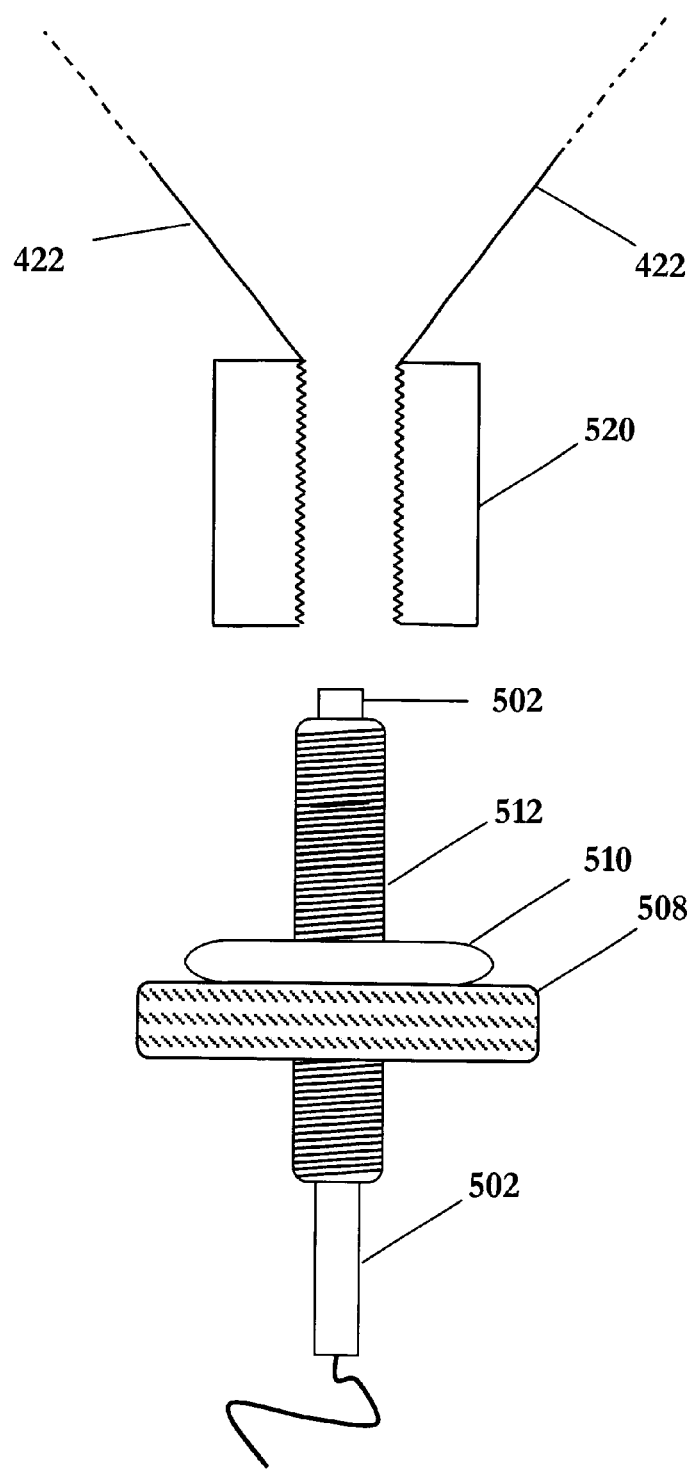
FIG. 4 depicts an implementation for adjustably inserting an ultrasonic transducer element 502 into the SIDR chamber 400.

The ultrasonic transducer 500 is capable of emitting pressure waves of various frequency and amplitude and can be tuned to create a standing pressure wave pattern within the SIDR chamber 420. Actual embodiments have produced good results at 20–40 kHz and at 1000–4000 watts. FIG. 4 depicts more detail of an implemented ultrasonic transducer 500 placement and adjustment within the SIDR chamber 420. The transducer element 502 is coupled through a transducer adapter to an transducer receiving orifice 520 situated at a junction of the SIDR chamber walls 422. The preferred transducer adapter is comprised of a threaded transducer receiving cylinder 512, an O-ring 510, and a knurled tuning disc 508. The threaded cylinder 512 and orifice 520 permits the depth of penetration of the transducer element 502 to be adjusted or tuned, to adjust the phase of the pressure wave 550, and create the standing pressure wave depending upon the dimensions of the SIDR chamber 420, the input power of the ultrasonic pressure wave 550, and the wavelength of the transducer frequency. The transducer receiving orifice 520 is internally threaded to match the threading on the transducer adapter. The SIDR chamber 400 will preferably have a packed-bed of a binding agent 410 thereby facilitating SBSO within the SIDR chamber 400. See FIG. 2. The methods of treating the contaminated resource may be accomplished using continuous flow, semi-batch, or batch processes.

The preferred embodiments are exemplary of a basic method of implementing the invention and is not intended to limit the scope of the invention. An ordinarily skilled practitioner in the art could modify the disclosure herein to manifest alternate embodiments employing the method and the apparatuses of the invention. Although particular embodiments of the invention have been described in detail, persons possessing ordinary skill in the art to which this invention pertains will appreciate that various modifications and enhancements may be made without departing from the spirit and scope of the claims that follow.

What is claimed is:

1. A method of treating a contaminated resource, including the use of at least one reaction chamber having a binding agent therein, comprising:

introducing oxidizing agents into the contaminated resource; and energizing in at least one reaction chamber the unbound contaminated resource and oxidizing agents with an ultrasonic pressure wave directed substantially counter to the direction of the flow of the contaminated resource and oxidizing agents facilitating breakdown and oxidation of contaminants within the contaminated resource.

2. The method of claim 1 wherein the step of energizing the unbound contaminated resource is performed within a reaction chamber using an ultrasonic transducer positioned substantially perpendicularly to an inlet to the reaction chamber and an outlet of the reaction chamber.

3. The method of claim 1 further comprising the step of introducing the energized unbound contaminated resource and oxidizing agents into at least one reaction chamber having a binding agent therein.

4. The method of claim 3 further comprising the step of re-circulating the treated contaminated resource until the contaminated resource reaches a threshold level of acceptable contamination.

5. The method of claim 1 wherein the contaminated resource is processed according to the types of processing selected from the group consisting of: continuous flow, semi-batch, and batch, processes.

6. The method of claim 1 wherein the oxidizing agents are generated from the group consisting of: ozone and hydrogen peroxide.

7. The method of claim 1 further comprising the step of filtering the contaminated resource prior to the introduction of oxidizing agents.

8. The method of claim 1 wherein the binding agent is a molecular sieve, ion exchange bed, membrane, fullerenes, or nanotube technology.

9. The method of claim 1 wherein the binding agent is selected from the group consisting of: engineered and natural clays, silica, sand, activated carbons, crushed glass, zeolites, granular carbon, and diatomaceous earth.

10. A contaminant oxidizing reactor for treating contaminated resource having an introduced oxidizing agent, comprising:

an oxidizing reaction chamber having at least one ultrasonic transducer and a binding agent therein.

11. The contaminant oxidizing reactor in claim 10 wherein the binding agent is selected from the group consisting of: engineered and natural clays, silica sand, activated carbons, crushed glass, zeolites, granular carbon, and diatomaceous earth.

12. The contaminant oxidizing reactor in claim 10 wherein the contaminated resource is introduced and glows through the oxidizing reaction chamber and encounters pressure waves from the ultrasonic transducer that are directed substantially counter to the flow of the contaminated water though the reaction chamber increasing the contaminant reactivity and the oxidizing properties of the oxidizing agent.

13. The contaminant oxidizing reactor in claim 12 wherein the contaminated resource is introduced into the oxidizing reaction chamber at a angle substantially perpendicularly to pressure waves emanating from the ultrasonic transducer.

14. The contaminant oxidizing reactor in claim 12 wherein the contaminated resource exits out of the oxidizing reaction chamber at a angle substantially perpendicularly to pressure waves emanating from the ultrasonic transducer.

15. The contaminant oxidizing reactor in claim 12 wherein the oxidizing reaction chamber has walls that minimized the destructive interference of pressure waves emitted from the ultrasonic transducer.

16. The contaminant oxidizing reactor in claim 15 wherein the oxidizing reaction chamber is substantially conically shaped and has converging walls, and the electronic transducer is positioned between the converging walls of the oxidizing reaction chamber.

17. The contaminant reactor of claim 10 wherein the electronic transducer creates a standing pressure wave within the oxidizing reaction chamber.

18. The contaminant oxidizing reactor of claim 17 wherein the phase is adjusted by modifying the depth of penetration of the ultrasonic transducer in the oxidizing reaction chamber.

19. The contaminant oxidizing reactor of claim 17 wherein the standing pressure wave is created by adjusting variables selected from the group consisting of: frequency and phase.

* * * * *

UNITED STATES PATENT AND TRADEMARK OFFICE
CERTIFICATE OF CORRECTION

PATENT NO.    : 6,630,073 B1
DATED         : October 7, 2003
INVENTOR(S)   : Eugene A. Moskal and H. Willard Spencer, III It is certified that error appears in the above-identified patent and that said Letters Patent is hereby corrected as shown below:

<u>Title page,</u>
Item [76], "Sawinson" should read -- Swainson --.

<u>Column 1,</u>
Line 40, the second "chlorine" should read -- chloramine --.

<u>Column 12,</u>
Line 15, "glows" should read -- flows --.
Line 19, "though" should read -- through --.

Signed and Sealed this

Second Day of December, 2003

JAMES E. ROGAN
*Director of the United States Patent and Trademark Office*